United States Patent [19]
Ramsey

[11] Patent Number: 5,773,048
[45] Date of Patent: Jun. 30, 1998

[54] RETAINER FOR INJECTION MOLDING MACHINE COMPONENTS

[76] Inventor: William C. Ramsey, R.R. #5, Bryan, Ohio 43506

[21] Appl. No.: 512,114

[22] Filed: Aug. 7, 1995

[51] Int. Cl.⁶ ................................................ B29C 45/44
[52] U.S. Cl. .................... 425/556; 264/318; 264/334; 425/577; 425/DIG. 58
[58] Field of Search ........................ 425/577, DIG. 58, 425/556; 249/177, 180, 185; 264/318, 334

[56] References Cited

U.S. PATENT DOCUMENTS

| | | | |
|---|---|---|---|
| 2,147,217 | 2/1939 | Rector. | |
| 2,859,478 | 11/1958 | Glasson. | |
| 3,523,344 | 8/1970 | Huber et al. | 25/89 |
| 3,813,203 | 5/1974 | Fisker et al. | 425/441 |
| 4,383,670 | 5/1983 | Olschewski et al. | 249/60 |
| 4,854,849 | 8/1989 | Sudo | 425/556 |
| 5,062,208 | 11/1991 | Goforth | 29/898.049 |
| 5,137,442 | 8/1992 | Starkey | 425/DIG. 58 |
| 5,281,127 | 1/1994 | Ramsey | 425/556 |

Primary Examiner—Tim Heitbrink
Attorney, Agent, or Firm—Brinks, Hofer Gilson & Lione

[57] ABSTRACT

A cylindrical retainer assembly for an injection molding machine includes a cylindrical body having a diametral through channel with a curved wall for receiving a complementarily configured end of an actuator. A spacer disc having a diameter substantially equal to the diameter of the cylindrical retainer body defines an aperture which receives and centers the actuator. The retainer assembly is received within a stepped cylindrical opening in the pin plate of the injection molding machine. An alternate embodiment retainer assembly includes a peripheral flange disposed adjacent the bottom of the retainer which may be received and retained within a cylindrical opening in the pin plate having straight walls and an adjacent recessed region. Pairs of resilient biasing members may be utilized to center the actuator in the cylindrical retainer.

18 Claims, 3 Drawing Sheets

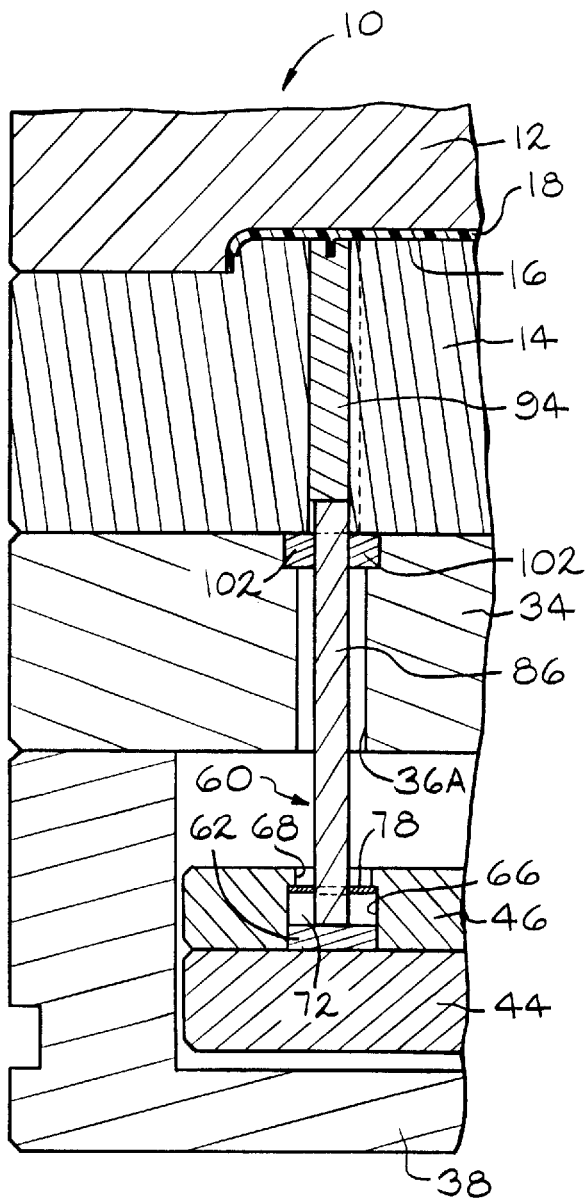
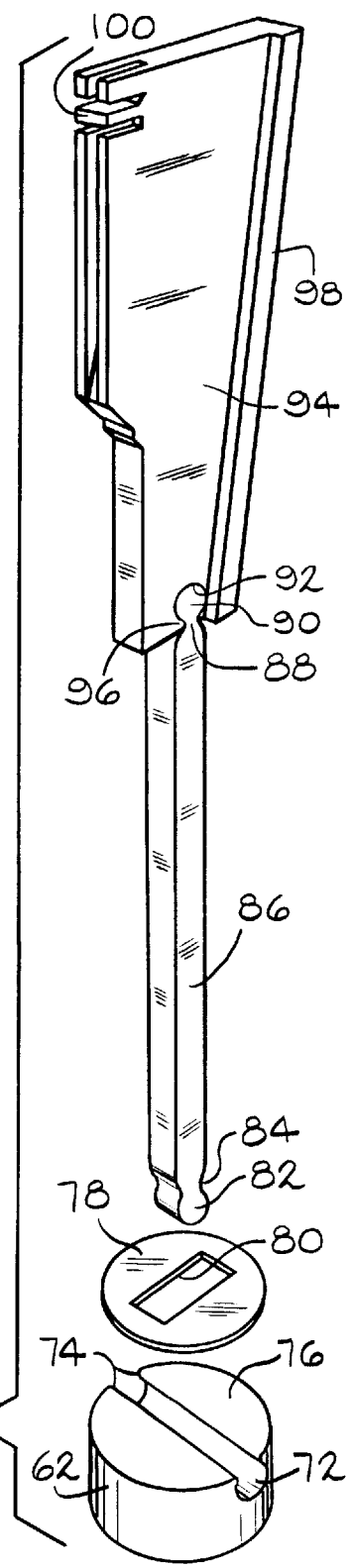
FIG. 3
FIG. 4

RETAINER FOR INJECTION MOLDING MACHINE COMPONENTS

BACKGROUND OF THE INVENTION

The invention relates generally to components for injection molding machines and more specifically to an improved retainer for receiving an actuator and lifter assembly for disposition in injection molding machines.

The formation of undercuts, reliefs and similar features in injection molded products typically requires the incorporation of moveable mold components referred to as core blades. Core blades are mounted upon lifters which are received within complementary passageways in the lower mold block and are coupled by an actuator to a retainer mounted in a pin plate which moves relative to the lower mold block.

In a first position, the core blade and lifter is seated within the lower mold block and forms undercuts, reliefs or similar features such as apertures having axes disposed in non-perpendicular orientations relative to the mold parting line. In a second position, the pin plate and ejector plate have moved toward the lower mold block, raising the actuator, lifter and core blade while simultaneously translating the lifter and core blade laterally, away from the undercut or aperture thereby releasing the molded part and allowing it to be removed from the mold cavity.

Such moveable mold components are represented in patented art. For example, U.S. Pat. No. 2,147,217 teaches a mold having side walls pivoted by knuckle joints which form an undercut in the side walls of the product. U.S. Pat. No. 2,859,478 also teaches a pivoting mold component utilizing a knuckle joint.

U.S. Pat. No. 3,523,344 presents an apparatus for pressing ceramic tile wherein an articulated linkage ejects the completed product from the mold. In U.S. Pat. No. 3,813,203, a pair of pivoted arms are coupled by a pneumatic cylinder. The arms operate to open and close the outer ring of a mold utilized to form concrete pipe.

U.S. Pat. No. 4,383,670 discloses a method and apparatus for casting or molding cages for rolling elements. Pairs of slides having obliquely oriented outer, mating surfaces cooperate to form pockets in the cages. U.S. Pat. No. 5,062,208 discloses a similar method and apparatus wherein pairs of obliquely divided halves of a mold insert are mated to form generally spherical openings in a bearing separator.

U.S. Pat. No. 4,854,849 discloses an injection mold having undercut portions which utilize conventional guide pins which are coupled at their lower extremities to sliders and guides. Such sliders are prone to sticking and thus malfunction if not continually and properly lubricated.

In my U.S. Pat. No. 5,281,127 an articulated lifter and actuator, which provides increased mold design flexibility, is disclosed and claimed. This core blade configuration includes a pair of spaced apart knuckle joints located at opposite ends of an intermediate force transferring member, the actuator. The lower knuckle joints are received within a complementarily configured opening in a retainer disposed in a pin plate.

It is apparent from a review of the foregoing prior art that improvements in retainer and lifter technology are both possible and desirable.

SUMMARY OF THE INVENTION

A cylindrical retainer assembly for use in injection molding machines includes a cylindrical body having a diametral through channel with a semi-cylindrical curved wall for receiving a complementarily configured end of an actuator. The channel has an extended, semi-cylindrical sidewall which defines a narrow throat. A circular plate or spacer disc having a diameter substantially equal to the diameter of the cylindrical retainer body defines an aperture which receives and centers the actuator. The cylindrical retainer is received and retained within a stepped cylindrical opening disposed in the pin plate of the injection molding machine. An alternate embodiment retainer assembly includes a shoulder or flange about the periphery of the cylindrical retainer body which may be received and retained within a cylindrical opening in the pin plate having straight walls and an adjacent recessed area.

The retainer assembly may be utilized with single piece and articulated actuator and lifter assemblies in a broad range of injection molding machines utilizing plastics, metals and other injectable and moldable materials. The cylindrical configuration simplifies pin plate design and fabrication in that the location may be specified simply as the center of a circle and formed by sequential drilling and counterboring operations. Assembly and disassembly of the retainer, actuator, lifter and pin plate are also simple and straightforward.

Thus it is an object of the present invention to provide a retainer assembly having a cylindrical body and centering spacer disposed thereatop.

It is a further object of the present invention to provide a cylindrical retainer assembly for use with articulated actuators and lifters in a wide variety of injection molding applications.

It is a still further object of the present invention to provide a cylindrical retainer assembly which is received and retained within a stepped cylindrical opening in an injection molding machine pin plate.

It is a still further object of the present invention to provide a cylindrical retainer assembly which is relatively inexpensive and easy to manufacture, install and use.

Further objects and advantages of the present invention will become apparent by reference to the following description of the preferred and alternate embodiments and appended drawings wherein like reference numerals refer to the same component, element or feature.

BRIEF DESCRIPTION OF THE DRAWINGS

FIG. 3 is a fragmentary, sectional view of a portion of an injection molding machine incorporating the preferred embodiment cylindrical retainer assembly, actuator and lifter according to the present invention taken along line 3—3 of FIG. 1;

FIG. 4 is an enlarged, perspective view of the preferred embodiment cylindrical retainer assembly, actuator and lifter according to the present invention.

DESCRIPTION OF THE PREFERRED AND ALTERNATE EMBODIMENTS

Figure 1:
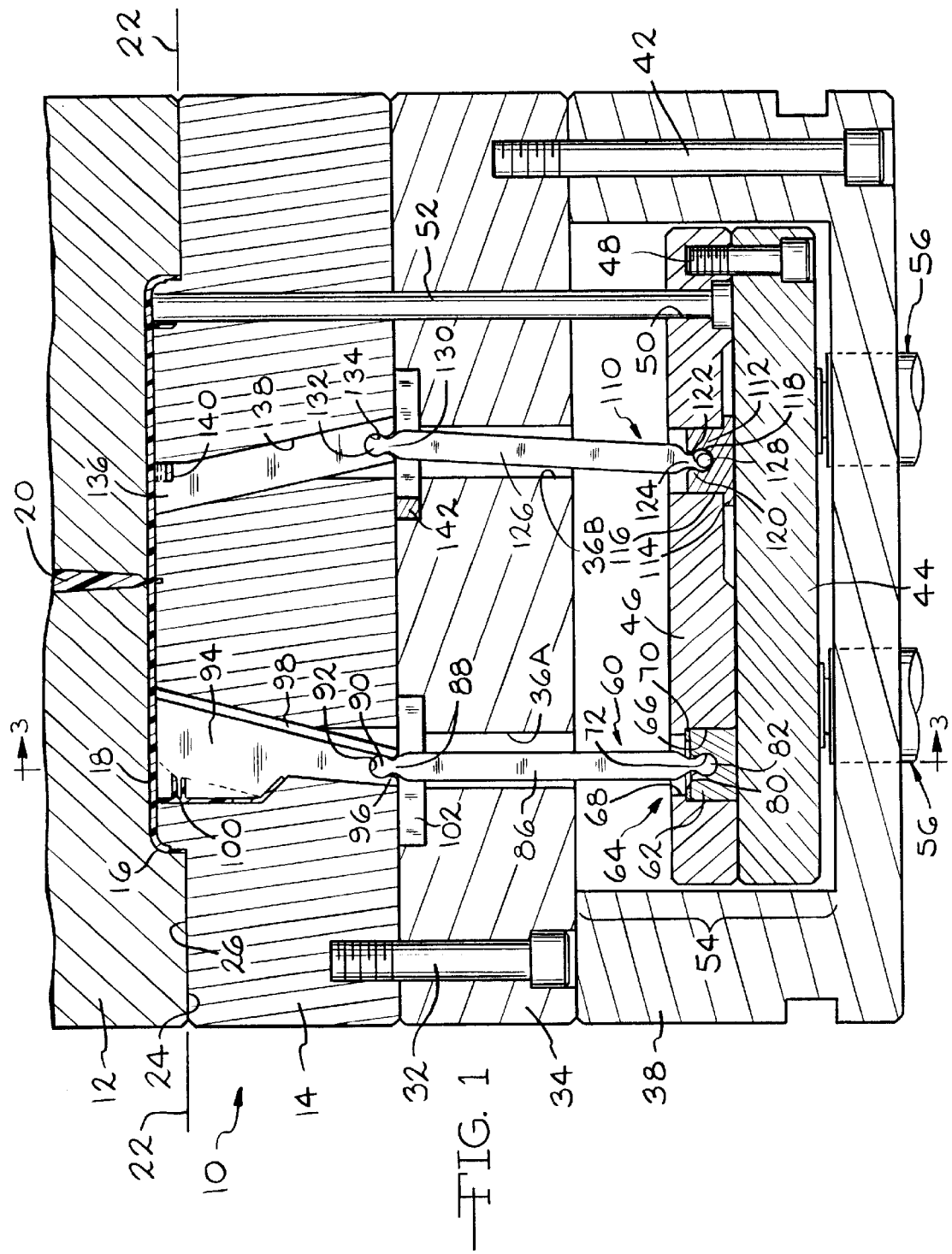
FIG. 1 is full, sectional view of a portion of an injection molding machine incorporating preferred and alternate embodiment cylindrical retainer assemblies according to the present invention in a closed, product forming position.
Figure 2:
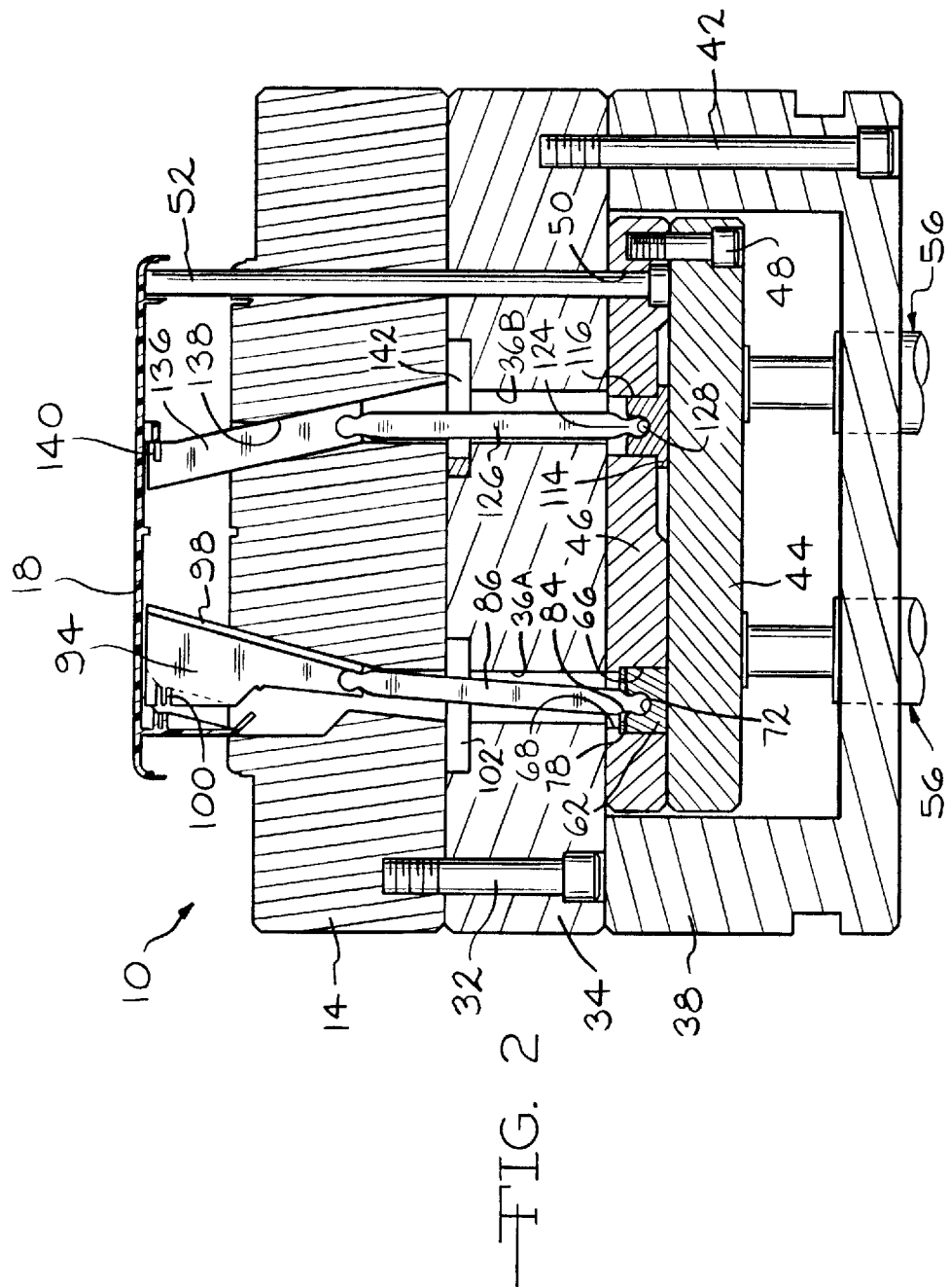
FIG. 2 is a full, sectional view of a portion of an injection molding machine incorporating preferred and alternate embodiment cylindrical retainer assemblies according to the present invention in an open, product releasing position.

Referring now to FIGS. 1 and 2, relevant portions of a typical injection molding machine are illustrated in cross section and generally designated by the reference numeral 10. The illustrated portions 10 of an injection molding machine are a cavity block 12 and a core block 14 disposed directly beneath the cavity block 12. The cavity block 12 and the core block 14 cooperatively define a mold cavity 16 which is substantially a negative of a product 18 to be molded as will be readily appreciated. A gate 20 functions as a passageway for injection molding media to flow under pressure into the mold cavity 16 when the mold cavity 16 is closed to produce the product 18 in accordance with conventional injection molding practice. The cavity block 12 is disposed on suitable guides (not illustrated) for bi-directional translation perpendicular to a parting line 22. The parting line 22 is defined by the lower face 24 of the cavity block 12 and the upper face 26 of the core block 14 when these components are in contact as illustrated in FIG. 1. Drive mechanisms which may be cams, single acting, spring biased or double acting pneumatic or hydraulic cylinders or any other suitable means (all not illustrated) provide motive force for raising and lowering the cavity block 12 as will be readily appreciated.

The core block 14 is secured by a plurality of threaded fasteners 32, one of which is illustrated in FIGS. 1 and 2, to a backup plate 34. The backup plate 34 generally defines a support member for the core block 14 and also includes a plurality of passageways 36A and 36B which receive various ejector components of the molding machine 10. The backup plate 34 is, in turn, supported by and secured to an ejector housing 38 by a plurality of threaded fasteners 42, one of which is illustrated in FIGS. 1 and 2.

Disposed within the ejector housing 38 is an ejector plate 44 which supports and is secured to a pin plate 46 by a plurality of fasteners 48, one of which is illustrated in FIGS. 1 and 2. All of the foregoing mold components are illustrative and exemplary of molding machines in general, and particularly injection molding machines, and may be fabricated of steel or other suitable strong and stable metal.

Coupled to the ejector plate 44 by the pin plate 46 for translation therewith and passing through an aperture 50 in the pin plate 46 is an ejector pin 52. Depending upon the size of the mold cavity 16 and thus the size of the product 18 and the configuration of the product 18, a plurality of ejector pins 52 will typically be utilized. As the ejector plate 44 translates vertically within the space 54 between the inside bottom face of the ejector housing 38 and the lower surface of the backing plate 34, the ejector pin 52 translates vertically into the mold cavity 16, raising and dislodging the molded product 18 therefrom. One or more single acting, spring biased or double acting pneumatic or hydraulic piston and cylinder assemblies 56 or functionally analogous devices such as sliding or rotating cams may be utilized to vertically translate the ejector plate 44 and associated components from the lowered, product forming position illustrated in FIG. 1 to the raised, product ejecting position illustrated in FIG. 2.

Turning now to FIGS. 1, 2 and 4, a preferred embodiment retainer and lifter assembly 60 includes a first cylindrical retainer 62 which is disposed within a complementary counterbored circular aperture 64. The aperture 64 includes a first, lower region 66 of a larger diameter which is complementary to and receives the cylindrical retainer 62 and a second, upper region 68 of a smaller diameter. The inside diameter of the lower region 66 is slightly larger than the outside diameter of the cylindrical retainer 62 such that the cylindrical retainer 62 is freely rotatably received therein. The two regions 66 and 68 of the opening 64 define and are disposed adjacent and on opposite sides of a shoulder 70 which overhangs and retains the cylindrical retainer 62 in the pin plate 46.

The cylindrical retainer 62 defines a centrally disposed, extended semi-cylindrical channel or socket 72 which preferably extends diametrally through the retainer 62 and communicates with a narrow slot or throat 74 defined by and adjacent the upper surface 76 of the cylindrical retainer 62. The term extended semi-cylindrical as used here means having walls or surfaces which extend cylindrically more, and preferably significantly more, than 180°. For example, in the retainer 62 illustrated, the cylindrical wall of the channel or socket 72 extends approximately 240°. A range of from 200° to 270° is suitable.

Positioned on the upper surface 76 of the cylindrical retainer 62 is a circular retaining disc or spacer 78. The retaining disc or spacer 78 has a diameter equal to or slightly less than the diameter of the cylindrical retainer 62 and preferably includes a rectangular aperture 80 centered therein. The channel or socket 72 of the retainer 62 receives a complementarily configured extended semi-cylindrical knuckle 82 having an adjacent first throat region 84 disposed on one end of a first pivot arm or actuator 86. The first pivot arm or actuator 86 may define any convenient or desired length and is terminated at its opposite end by a second throat region 88 and an extended semi-cylindrical knuckle 90. The knuckle 90 is in turn received within a complementarily configured extended semi-cylindrical channel or socket 92 defined by the lower end of a first lifter 94. The channel or socket 92 preferably extends through the first lifter 94 and communicates with a narrow slot or throat 96 defined by opposed edges of the lifter 94.

The knuckle joints comprising the channel or socket 72 and the knuckle 82 and the knuckle 90 and the channel or socket 92 may also be mating ball and socket components. This configuration does not, however, provide any known performance benefits and such parts are generally more difficult and expensive to manufacture.

The first lifter 94 may include a longitudinal flange or heel 98 extending along one vertical edge. The heel 98 cooperates with a complementary channel (not illustrated) in the core block 14 to guide its motion. The opposite edge of the first lifter 94 defines a core blade 100 which produces an undercut or other feature in the product 18 which cannot be released by simple upward motion of the product 18 out of the mold cavity 16, such as that provided by the ejector pins 52.

The cooperating channel or socket 72 and the knuckle 82 and the cooperating channel or socket 92 and the knuckle 90 preferably provide limited pivoting motion of about 8° to 10° each but such range of motion may be reduced to about 5° or increased to about 20° or greater if desired. The cylindrical retainer 62, the first actuator 86 and the first lifter 94 are preferably made of hardened tool steel, bronze or other suitable material and are adapted to be fabricated by electron discharge machining (EDM). While an actuator 86 having two knuckles 82 and 90 which mate with the channel or socket 72 in the cylindrical retainer 62 and the socket 92 in the first lifter 94 is the preferred arrangement, it will be appreciated that one or both of these features and locations may be exchanged, thereby locating the sockets 72 and 92 on the actuator 86 and the knuckles 82 and 90 on the cylindrical retainer 62 and the lifter 94.

As better illustrated in FIG. 3, a heel plate or pair of parallel bars or landing pads 102 extend generally perpendicularly and horizontally along opposite faces of the first actuator 86 near the first lifter 94. The landing pads 102 function as shims or stops which adjust the vertical, retracted position of the first lifter 94 in order that the undercuts and other features formed by the core blade 100 of the first lifter 94 are properly positioned within the mold cavity 16. The landing pads 102 are preferably used because the vertical travel of the ejector plate 44 and associated components in a typical injection molding machine 10 may not be controlled with sufficient accuracy to properly position the lifter 94 within the mold block 14 to provide optimum quality to the molded product 18.

Referring now to FIGS. 1 and 2, a first alternate embodiment retainer and lifter assembly 110 is illustrated and includes a second cylindrical retainer 112 having a first diameter which includes a base flange 114 having a larger, second diameter. The second cylindrical retainer 112 is received in a complementarily sized circular aperture 116 formed in the pin plate 46. The inside diameter of the aperture 116 is slightly larger than the outside diameter of the smaller (first diameter) region of the cylindrical retainer 112 such that it is freely rotatably received therein. The second cylindrical retainer 112 defines a diametral, extended, semi-cylindrical channel or socket 118 having a narrow throat 120 which receives a complementarily configured semi-cylindrical knuckle 122 having an adjacent narrow throat 124 on one end of a second pivot arm or actuator 126. The second actuator 126 is held centered in the channel or socket 118 of the second cylindrical retainer 112 by a pair of opposed spacing or centering members 128 one of which is illustrated in FIG. 1. The spacing members 128 may be compression springs, plugs, bushings, cylinders or other diverse shapes of an resilient elastomeric material such as rubber or relatively rigid material such as plastic or metal. Each of the pair of spacing members 128 preferably has a length approximately equal to the distance between one face of the actuator 126 and the wall of the aperture 116 when the actuator 126 is centered therein.

The second actuator 126 may define any convenient or desired length and is terminated at its opposite end by a second narrow throat 130 and semi-cylindrical knuckle 132. The knuckle 132 is received within a complementarily formed extended semi-cylindrical recess 134 defined by the lower end of a second lifter 136. The second lifter 136 does not include a heel inasmuch as its translation is fully constrained by the parallel walls of a passageway 138 in the core block 14. A second core blade 140 on the second lifter 136 defines a mold cavity region which produces an undercut or other feature on the product 18 which cannot be released by simple upward motion of the product 18 out of the mold cavity 16, such as that provided by the ejector pins 52.

As illustrated in FIGS. 1 and 2, a heel plate or pair of parallel landing pads 142 comprise portions of a unitary, U-shaped member which extends generally perpendicularly and horizontally around and along opposite faces of the actuator 126. The pair of landing pads 142 function in the same manner as the pair of landing pads 102 discussed above.

Inspection of the preferred embodiment retainer and lifter assembly 60 and the alternate embodiment retainer and lifter assembly 110, reveals that such devices and their molding surfaces may take many forms such as variations in length, curvature, lip configuration and the like in order to accommodate and fabricate undercuts, apertures and other features of injection molded products requiring movement of mold components in order to release a molded product. Inasmuch as the present invention relates to the configuration of the retainer assembly and its combination with actuators and lifters rather than the specific configuration of the lifter and undercut forming feature, it will be appreciated that retainers according to the present invention will have wide and diverse application in injection molding machines requiring moveable mold components to achieve undercuts, apertures and similar features.

Inspection of the preferred embodiment retainer and lifter assembly 60 and the alternate embodiment retainer and lifter assembly 110 also reveals that such retainer configurations greatly simplify the design, fabrication and assembly of ejector assemblies including the pin plates of injection molding machines. The cylindrical retainers 62 and 112, respectively, may be located and installed simply by first drilling appropriately located circular apertures in the pin plate 46 with a conventional circular drill bit. Then, in the case of the preferred embodiment retainer 62 the circular aperture is counterbored and in the case of the alternate embodiment retainer 112, a relatively larger recessed or re-entrant area is formed. In prior art configurations wherein retainers were square or rectangular, complementary, complexly shaped openings in the pin plate were necessary in order to receive the retainers.

Likewise, and of substantially equal importance, is the ease with which the retainers 62 and 112 themselves may be fabricated. The starting point, of course, is cylindrical bar stock which, in the case of the preferred embodiment cylindrical retainer 62 need only have the appropriate through diametral channel or socket 72 formed therein and, in the case of the alternate embodiment cylindrical retainer 112, have the base flange 114 formed, typically by reducing, through machining or other suitable processes, the diameter of a portion of such bar stock adjacent the flange 114 and then forming the through diametral channel or socket 118.

An additional feature and benefit of the invention should also be noted. Both the preferred embodiment cylindrical retainer 62 and the first alternate embodiment cylindrical retainer 112 are angularly self-aligning in that they are preferably sized to fit snugly but rotate freely within the pin plate 46 such that the respective actuators 86 and 126 as well as the associated lifters 94 and 136 may rotatably self-adjust so as to align and operate without binding as might otherwise be the case with slight angular or rotational misalignment between the various lifter and actuator passageways and the mounting openings for conventional square or rectangular retainers.

Finally, it should be appreciated that the elements and features of the preferred and alternate embodiment retainer assemblies 60 and 110, respectively, may be, and are intended to be, exchanged and interchanged. For example, the spacing members 128 may be utilized with the preferred embodiment retainer assembly 60 instead of, or in addition to, the spacer 78.

The foregoing disclosure is the best mode devised by the inventor for practicing this invention. It is apparent, however, that apparatus incorporating modifications and variations will be obvious to one skilled in the art of lifters and retainers for injection molding machines. Inasmuch as the foregoing disclosure is intended to enable one skilled in this art to practice the instant invention, it should not be construed to be limited thereby but should be construed to include such aforementioned obvious variations and be limited only by the spirit and scope of the following claims.

I claim:

1. A retainer assembly for receiving an actuator of a lifter mechanism for an injection molding machine comprising, in combination, a cylindrical body having a top surface, a channel having an open throat adjacent said top surface defined by opposed, spaced-apart edges and a curved wall region merging with said edges, and a spacer disposed on said top surface, said spacer defining an aperture adapted for receiving said actuator of said lifter mechanism, wherein said spacer maintains said actuator in a centered position when said actuator of said lifter mechanism is received by said cylindrical body.

2. The retainer assembly of claim 1 wherein said actuator has a pair of ends, one end defining a knuckle adapted to be received within said channel of said cylindrical body.

3. The retainer assembly of claim 2 further including a lifter defining an additional channel adapted to receive the other of said ends, said additional channel having an additional open throat defined by opposed, spaced-apart edges and an additional curved wall region merging with said edges of said additional open throat, said lifter including means for forming an undercut.

4. The retainer assembly of claim 1 wherein the width of said spacer aperture is slightly greater than the width of the actuator.

5. The retainer assembly of claim 1 wherein said cylindrical body further includes a bottom surface opposite said top surface and a peripheral flange disposed adjacent said bottom surface.

6. The retainer assembly of claim 1 wherein said curved wall region is semi-cylindrical.

7. The retainer assembly of claim 1 wherein said curved wall region extends over at least 200°.

8. A retainer assembly for a lifter mechanism for disposition in an injection molding machine comprising, in combination, a cylindrical retainer adapted for mounting in an ejector plate of an injection molding machine, said cylindrical retainer having a top surface, a channel having an open throat adjacent said to surface defined by opposed, spaced-apart edges and a curved wall region merging with said edges, and a disc disposed on said top surface, said disc defining an aperture adapted for receiving an actuator of said lifter mechanism, wherein said disc maintains said actuator in a centered position when said actuator of said lifter mechanism is received by said cylindrical body.

9. The retainer assembly of claim 8 wherein said cylindrical body further includes a bottom surface opposite said top surface and a flange disposed adjacent said bottom surface.

10. The retainer assembly of claim 8 further including an actuator having a first end and a second end, first means disposed on said first end of said actuator for pivotally coupling said first end of said actuator to said cylindrical retainer, a lifter having means for forming an undercut, and second means disposed on said second end of said actuator and said lifter for pivotally coupling said second end of said actuator to said lifter.

11. The retainer assembly of claim 8 wherein said channel extends diametrally through said cylindrical body.

12. The retainer assembly of claim 8 wherein said cylindrical retainer is disposed in a counterbored opening in said ejector plate.

13. A retainer assembly for receiving a lifter assembly for an injection molding machine comprising, in combination, a cylindrical retainer adapted for mounting in an ejector plate of an injection molding machine, said cylindrical retainer having a top surface, a diametral channel having an extended semi-cylindrical wall region and a throat in said top surface, and a spacer disposed on said top surface, said centering member defining an aperture adapted for receiving an actuator of the lifter assembly, wherein said spacer maintains said actuator in a centered position when said actuator is received by said cylindrical body.

14. The retainer assembly of claim 13 wherein said cylindrical retainer further includes a bottom surface opposite said top surface and a flange disposed adjacent said bottom surface.

15. A retainer assembly for an injection molding machine comprising, in combination, a cylindrical body having a top surface, a channel having an open throat adjacent said top surface defined by opposed, spaced-apart edges and a curved wall region merging with said edges, and at least one centering member disposed within said open throat for frictionally engaging an actuator of said injection molding machine, wherein said at least one centering member maintains said actuator in a centered position when said actuator is received by said cylindrical body.

16. The retainer assembly of claim 15 wherein said actuator includes a pair of ends, one of said ends defining a knuckle adapted to be received within said channel of said cylindrical body.

17. The retainer assembly of claim 16 further including a lifter defining an additional channel adapted to receive the other of said ends, said additional channel having an additional open throat defined by opposed, spaced-apart edges and an additional curved wall region merging with said edges of said additional open throat, said lifter including means for forming an undercut.

18. The retainer assembly of claim 15 wherein said at least one spacer member comprises an elastomeric material.

* * * * *